United States Patent
Kim et al.

(10) Patent No.: US 8,793,437 B2
(45) Date of Patent: Jul. 29, 2014

(54) CACHE MEMORY SYSTEM USING TEMPORAL LOCALITY INFORMATION AND A DATA STORAGE METHOD

(75) Inventors: Jong Myon Kim, Yongin-si (KR); Soojung Ryu, Cheonan-si (KR); Dong-Hoon Yoo, Suwon-si (KR); Dong Kwan Suh, Uiwang-si (KR); Jeongwook Kim, Sungnam-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 1369 days.

(21) Appl. No.: 11/835,635

(22) Filed: Aug. 8, 2007

(65) Prior Publication Data
US 2008/0263281 A1    Oct. 23, 2008

(30) Foreign Application Priority Data
Apr. 18, 2007 (KR) .................. 10-2007-0037969

(51) Int. Cl.
  G06F 12/00 (2006.01)
  G06F 13/00 (2006.01)
  G06F 13/28 (2006.01)
(52) U.S. Cl.
  USPC ........... 711/122; 711/119; 711/133; 711/135; 711/E12.043
(58) Field of Classification Search
  USPC ........................................ 711/122
  See application file for complete search history.

(56) References Cited

U.S. PATENT DOCUMENTS

| | | | | |
|---|---|---|---|---|
| 5,261,066 A | * | 11/1993 | Jouppi et al. | 711/122 |
| 5,983,324 A | * | 11/1999 | Ukai et al. | 711/137 |
| 6,542,966 B1 | * | 4/2003 | Crawford et al. | 711/133 |
| 6,578,111 B1 | * | 6/2003 | Damron et al. | 711/133 |
| 6,950,837 B2 | | 9/2005 | Subramoney et al. | |
| 7,114,011 B2 | | 9/2006 | Buch et al. | |
| 2002/0194210 A1 | | 12/2002 | Subramoney et al. | |
| 2007/0050548 A1 | * | 3/2007 | Bali et al. | 711/118 |
| 2007/0234003 A1 | * | 10/2007 | Naruse | 711/202 |

FOREIGN PATENT DOCUMENTS

| | | |
|---|---|---|
| JP | 02-096253 A | 4/1990 |
| JP | 2002-73415 A | 12/2002 |
| JP | 2006-114206 A | 4/2006 |
| KR | 2000-0020378 A | 4/2000 |

* cited by examiner

Primary Examiner — Eric S Cardwell
(74) Attorney, Agent, or Firm — Sughrue Mion, PLLC

(57) ABSTRACT

A cache memory system using temporal locality information and a data storage method are provided. The cache memory system including: a main cache which stores data accessed by a central processing unit; an extended cache which stores the data if the data is evicted from the main cache; and a separation cache which stores the data of the extended cache when the data of the extended cache is evicted from the extended cache and temporal locality information corresponding to the data of the extended cache satisfies a predetermined condition.

33 Claims, 3 Drawing Sheets

CACHE MEMORY SYSTEM USING TEMPORAL LOCALITY INFORMATION AND A DATA STORAGE METHOD

CROSS-REFERENCE TO RELATED APPLICATIONS

This application claims priority from Korean Patent Application No. 10-2007-0037969, filed on Apr. 18, 2007, in the Korean Intellectual Property Office, the entire disclosure of which is incorporated herein by reference.

BACKGROUND OF THE INVENTION

1. Field of the Invention

Methods and apparatuses consistent with the present invention relate to a memory system configuring a computer system, and more particularly to a hierarchical memory architecture represented by a cache memory.

2. Description of Related Art

A cache memory is used to utilize a memory in a computer system more efficiently, and is located between a central processing unit and a main memory. Also, a cache memory is smaller than a main memory and may be accessed more rapidly than a main memory.

A performance of a cache memory system is determined by a cache hit ratio, a data access time when a cache hit occurs, a penalty when a cache miss occurs, and the like.

For example, when a size of a cache memory increases, a lifetime of data and a cache hit ratio may increase. However, a data access time may also increase. Accordingly, the size of a cache memory should be optimized.

In a direct mapping cache, when data is stored in a cache, a single location where the data is stored is determined.

A cache using the direct mapping scheme may be embodied in a relatively simple circuit. Accordingly, in a direct mapping cache, a data access time when a cache hit occurs in the cache is short. However, a cache hit ratio of the cache is relatively low.

In a direct mapping cache, when a cache miss occurs and a previous data stored in a cache is evicted, a victim cache is used to improve a cache hit ratio. The victim cache stores the previous data in another cache of a same level for a short time.

However, when data, required to be stored in a same location of a cache, is repeatedly accessed over a short time, data to be recycled may be evicted from a victim cache due to a small size of the victim cache. Accordingly, a cache miss may occur. Thus, a configuration to extend a lifetime of data is needed to be developed as a method for efficient management. The method for efficient management divides data into data to be recycled and data not to be recycled, without an increase of the size of a cache memory.

Thus, an efficient cache memory system is required in a computer system.

SUMMARY OF THE INVENTION

The present invention provides a cache memory system which may extend a lifetime of data without an increase of a size of a cache memory.

Another aspect of the present invention also provides a cache memory system which may raise a cache hit ratio without an increase of a data access time when a cache hit occurs.

According to an aspect of the present invention, there is provided a cache memory system, including: a main cache which stores data accessed by a central processing unit; an extended cache which stores data evicted from the main cache; and a separation cache which stores data of the extended cache when the data of the extended cache is evicted from the extended cache and temporal locality information corresponding to the data of the extended cache satisfies a predetermined condition.

According to another aspect of the present invention, there is provided a data storage method, including: storing data evicted from a main cache in an extended cache; determining whether temporal locality information corresponding to the data satisfies a predetermined condition when the data is evicted from the extended cache; storing the data in a separation cache when the temporal locality information satisfies the predetermined condition as a result of the determination; and evicting the data to a lower level memory when the temporal locality information does not satisfy the predetermined condition as the result of the determination.

BRIEF DESCRIPTION OF THE DRAWINGS

The above and other aspects of the present invention will become apparent and more readily appreciated from the following detailed description of certain exemplary embodiments of the invention, taken in conjunction with the accompanying drawings, in which.

DETAILED DESCRIPTION OF EXEMPLARY EMBODIMENTS

Figure 1:
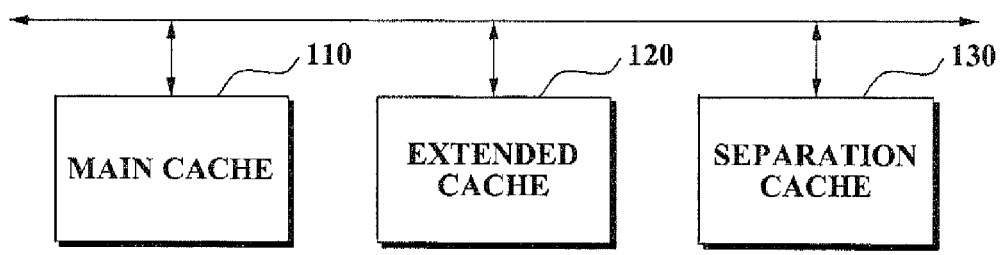
FIG. 1 is a block diagram illustrating a cache memory system according to an exemplary embodiment of the present invention.

Reference will now be made in detail to exemplary embodiments of the present invention, examples of which are illustrated in the accompanying drawings, wherein like reference numerals refer to the like elements throughout. The exemplary embodiments are described below in order to explain the present invention by referring to the figures.

FIG. 1 is a block diagram illustrating a cache memory system according to an exemplary embodiment of the present invention.

Referring to FIG. 1, the cache memory system according to an exemplary embodiment of the present invention includes a main cache 110, an extended cache 120, and a separation cache 130.

The main cache 110 stores data accessed by a central processing unit.

Generally, the data accessed by the central processing unit may be repeatedly accessed over a short time. Accordingly, the data accessed by the central processing unit is required to be stored in the main cache 110 for a rapid access when a request for access is generated again.

A temporal locality refers to a likelihood where data is accessed by the central processing unit and accessed again in a short time.

A direct mapping scheme is a storage method in which when data is stored in the main cache 110, a single location where the data is stored is determined.

When data accessed by the central processing unit is to be stored in the main cache 110 of the direct mapping scheme, and another data is stored in a location where the data accessed by the central processing unit is to be stored, the other data is evicted from the main cache 110.

In a full associative scheme, when data is to be stored in the main cache 110 and an empty space exists in the main cache 110, the data and a relative address index are stored in the empty space.

When the data accessed by the central processing unit is to be stored in the main cache 110 of the full associative scheme, and an empty space does not exist in the main cache 110, an arbitrary data of data previously stored in the main cache 110 is evicted from the main cache 110.

In a set associative scheme, when data is to be stored in the main cache 110, a plurality of locations where the data may be stored is determined. The set associative scheme may be considered as a particular style of the direct mapping cache and the full associative schemes.

When data accessed by the central processing unit is to be stored in the main cache 110 of the set associative scheme, and another data is stored in each space where the data may be stored, any one of the other data previously stored is evicted from the main cache 110.

The extended cache 120 stores the data evicted from the main cache 110.

In this instance, the extended cache 120 may store all data evicted from the main cache 110.

A lifetime of data refers to a period of time from when the data is accessed by the central processing unit and stored in the main cache 110 to when the data is evicted from the main cache 110 and transmitted to a lower level memory.

When the extended cache 120 is in a same level as the main cache 110, the data may be maintained in the extended cache 120 after being evicted from the main cache 110, and thus the lifetime may increase.

When temporal locality information corresponding to data, evicted from the extended cache 120, satisfies a predetermined condition, the separation cache 130 stores the data evicted from the extended cache 120. In this instance, the data of the extended cache 120 is evicted from the extended cache 120 via a data path.

The separation cache 130 separates and stores only data satisfying the predetermined condition.

When data is accessed by the central processing unit more than once during the lifetime of the data, the data is temporal.

When data is not accessed by the central processing unit during the lifetime of the data and evicted to a lower level memory, the data is non-temporal.

In this instance, the temporal locality information may be associated with whether data of the extended cache 120 has been accessed by the central processing unit.

In this instance, the predetermined condition may correspond to a condition where the data is temporal. Thus, all data transmitted via the data path is temporal.

Alternatively, the predetermined condition may correspond to a condition where the data is non-temporal. Thus, all data transmitted via the data path is non-temporal.

In this instance, the data may include a tag corresponding to the temporal locality information.

In this instance, data may include a plurality of words.

When at least one of the plurality of words included in the data is accessed by the central processing unit during the lifetime of the data, the data is temporal.

According to an application where a cache memory system according to an exemplary embodiment of the present invention is used, the central processing unit may mainly access non-temporal data. In this case, when the predetermined condition corresponds to a condition where data is temporal, the separation cache 130 stores only temporal data. Temporal data evicted from the main cache 110 and the extended cache 120 is separated from non-temporal data and stored in the separation cache 130. Since the data which is temporal and intermittently accessed is stored in the separation cache 130, the main cache 110 mainly stores the non-temporal data. Accordingly, a cache hit ratio, that is, an access success rate by the central processing unit, may be raised.

According to another application where the cache memory system according to the exemplary embodiment of the present invention is used, the central processing unit may mainly access temporal data. In this case, when the predetermined condition corresponds to a condition that data is non-temporal, the separation cache 130 stores only non-temporal data. Non-temporal data evicted from the main cache 110 and the extended cache 120 is separated from temporal data and stored in the separation cache 130. Since the data which is non-temporal and intermittently accessed is stored in the separation cache 130, the main cache 110 mainly stores the temporal data. Accordingly, the cache hit ratio, that is, the access success rate by the central processing unit, may be raised.

An extended cache of a cache memory system according to another exemplary embodiment of the present invention may evict data of the extended cache to a lower level memory, when temporal locality information does not satisfy a predetermined condition.

In this instance, the cache memory system may include a 1-to-N multiplexer which uses the temporal locality information as a control signal. N is a natural number greater than two. An input of the multiplexer corresponds to the data of the extended cache 120, any one of outputs of the multiplexer is connected to the separation cache 130, and another one of the outputs of the multiplexer may be connected to the lower level memory.

When data of the extended cache 120 is accessed by the central processing unit when a cache hit occurs, a cache memory system according to still another exemplary embodiment of the present invention updates temporal locality information corresponding to the accessed data. Also, when the updated temporal locality information does not satisfy a predetermined condition, the cache memory system may swap the data of the extended cache with any one of data of the main cache.

In this instance, the cache memory system may include a 1-to-N multiplexer which uses the temporal locality information as a control signal. In this instance, N is a natural number greater than two. An input of the multiplexer corresponds to the data of the extended cache 120, any one of outputs of the multiplexer corresponds to a data line connected to the central processing unit, and another one of the outputs of the multiplexer may correspond to a data line connected to the main cache 110.

In the cache memory system according to another exemplary embodiment of the present invention, the main cache 110 may include a circuit capable of updating temporal locality information of data of the main cache every time the data of the main cache is accessed by the central processing unit.

In this instance, the extended cache 120 may include a circuit capable of updating temporal locality information of data of the extended cache every time the data of the extended cache is accessed by the central processing unit.

In this instance, when data includes a plurality of words, the circuit may update temporal locality information with respect to each word.

In the cache memory system according to another exemplary embodiment of the present invention, each of the extended cache 120 and the separation cache 130 has a smaller size than the main cache 110, and has a higher associativity than the main cache 110.

In this instance, each of the extended cache 120 and the separation cache 130 may be in a same level as the main cache.

In this instance, the main cache 110 may store data based on the direct mapping scheme. Each of the extended cache 120 and the separation cache 130 may store the data based on any one of the full associative scheme and the set associative scheme.

A performance of the cache memory system is determined by a cache hit ratio, a data access time when a cache hit occurs, a penalty when a cache miss occurs, and the like.

The main cache 110 using the direct mapping scheme may be embodied in a relatively simple circuit. Accordingly, a data access time when a cache hit occurs in the main cache 110 may be short. However, a cache hit ratio of the main cache 110 is lower than that of other methods.

A cache memory system, which includes the main cache 110 using the direct mapping scheme and the separation cache 130 and the extended cache 120 using the full associative scheme or the set associative scheme, like the cache memory system according to an exemplary embodiment of the present invention may raise the cache hit ratio by the separation cache 130 and the extended cache 120 as well as maintain a short data access time in the cache hit.

The extended cache 120 of the cache memory system according to another exemplary embodiment of the present invention may evict previous data to a lower level memory. The previous data is previously stored in a location where data is newly stored in the extended cache 120.

The extended cache 120 may be any one of the full associative scheme or the set associative scheme. When an empty space no longer exists in the extended cache 120, or an empty space no longer exists in the location where data is newly stored, any one of the previous data previously stored may be evicted to the lower level memory.

Figure 3:
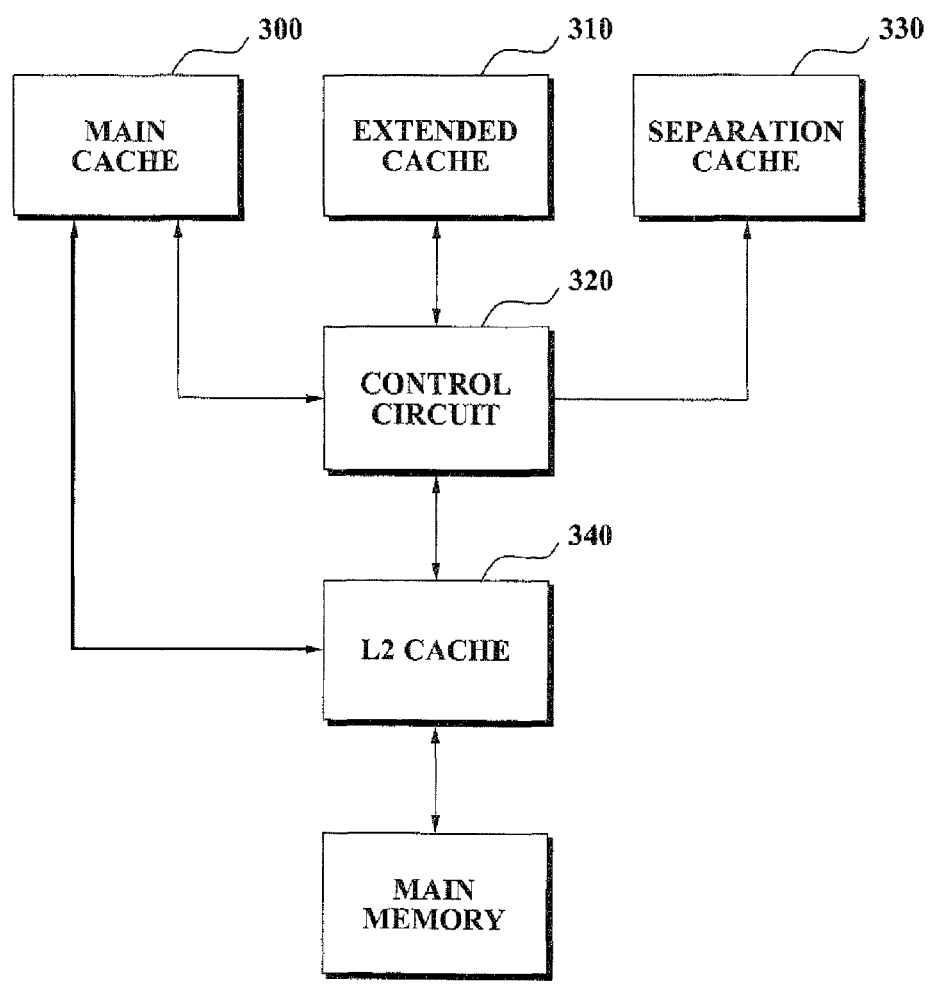
FIG. 3 is a block diagram illustrating a cache memory system according to another exemplary embodiment of the present invention.

FIG. 3 is a block diagram illustrating a cache memory system according to another exemplary embodiment of the present invention.

Referring to FIG. 3, the cache memory system according to another exemplary embodiment of the present invention includes an extended cache 310, a control circuit 320, a separation cache 330, and an L2 cache 340 in addition to a main cache 300.

The L2 cache 340 refers to a level two cache and is an exemplary embodiment of a lower level memory.

When data stored in the L2 cache 340 is accessed by a central processing unit and temporal locality information corresponding to the accessed data satisfies a predetermined condition, the cache memory system may copy the accessed data to the separation cache 330.

When storing data, the L2 cache 340 stores the data as well as temporal locality information corresponding to the data. When the data stored in the L2 cache 340 is accessed by the central processing unit and the temporal locality information corresponding to the accessed data satisfies the predetermined condition, the accessed data may be copied to the separation cache 330. The predetermined condition may be any one of a condition where the accessed data is temporal and a condition where the accessed data is non-temporal.

When the L2 cache 340 has a similar configuration to the main cache 300 and stores data, the L2 cache 340 may store the data as well as temporal locality information corresponding to the data.

The cache memory system according to another exemplary embodiment of the present invention stores only data, excluding temporal locality information corresponding to the data, in the lower level memory. Also, the data may be copied to the main cache 300 while the temporal locality information is reset.

When the data is stored in the lower level memory, the temporal locality information is lost. When the data is accessed by the central processing unit and is copied to the main cache 300, the data is stored in the main cache 300 while the temporal locality information is reset.

After storing the data in the main cache, the data is located in any one of the extended cache 310, the separation cache 330, and the main cache 300 until the data is evicted to the lower level memory.

Figure 2:
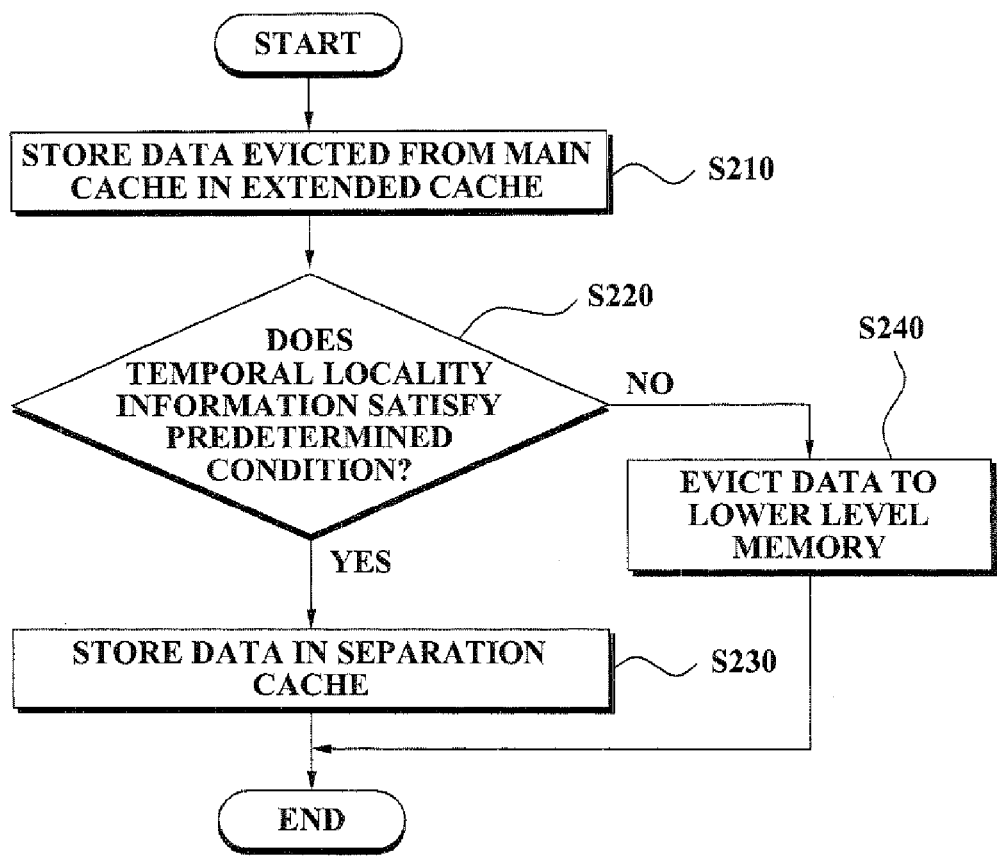
FIG. 2 is a flowchart illustrating a data storage method according to an exemplary embodiment of the present invention.

FIG. 2 is a flowchart illustrating a data storage method according to an exemplary embodiment of the present invention.

Referring to FIG. 2, in operation S210, the data storage method according to an exemplary embodiment of the present invention stores data evicted from a main cache in an extended cache.

In operation S220, when the data is evicted from the extended cache, the data storage method determines whether temporal locality information corresponding to the data satisfies a predetermined condition.

In this instance, the temporal locality information may be associated with whether the data has been accessed by a central processing unit.

In operation S230, when the temporal locality information satisfies the predetermined condition as a result of the determination in operation S220, the data storage method stores the data in a separation cache.

In this instance, the predetermined condition corresponds to a condition where the data is temporal. All data stored in the separation cache may be temporal.

According to an application where a cache memory system according to an exemplary embodiment of the present invention is used, the central processing unit may mainly access non-temporal data. In this case, when the predetermined condition corresponds to a condition where the data is temporal, the separation cache stores only temporal data. Temporal data evicted from the main cache and the extended cache is separated from non-temporal data and stored in the separation cache. Since the data which is temporal and intermittently accessed is stored in the separation cache, the main cache mainly stores the non-temporal data. Accordingly, a cache hit ratio, that is, an access success rate by the central processing unit, may be raised.

In this instance, the predetermined condition corresponds to a condition where the data is non-temporal. All the data stored in the separation cache may be non-temporal.

According to another application where the cache memory system according to the exemplary embodiment of the present invention is used, the central processing unit may mainly access temporal data. In this case, when the predetermined condition corresponds to a condition where the data is non-temporal, the separation cache stores only non-temporal data. Non-temporal data evicted from the main cache and the extended cache is separated from the temporal data and stored in the separation cache. Since the data which is non-temporal and intermittently accessed is stored in the separation cache, the main cache mainly stores the temporal data. Accordingly, the cache hit ratio, that is, the access success rate by the central processing unit, may be raised.

In this instance, the data may include a tag corresponding to the temporal locality information.

In this instance, the data may include a plurality of words.

When at least one of the plurality of words included in the data is accessed by the central processing unit during the lifetime of the data, the data is temporal.

In operation S240, when the temporal locality information does not satisfy the predetermined condition as a result of the determination in operation S220, the data storage method evicts the data to a lower level memory.

In this instance, a 1-to-N multiplexer may transmit and copy the data to the separation cache according to a control signal. Otherwise, the data may be evicted to the lower level memory. The 1-to-N multiplexer uses the temporal locality information as the control signal, and N is a natural number greater than two.

In a data storage method according to another exemplary embodiment of the present invention, a main cache may include a circuit capable of updating temporal locality information of data of the main cache every time the data of the main cache is accessed by a central processing unit.

In this instance, an extended cache may include a circuit capable of updating temporal locality information of data of the extended cache every time the data of the extended cache is accessed by the central processing unit.

In this instance, when data includes a plurality of words, the circuit may update temporal locality information with respect to each word.

In the data storage method according to another exemplary embodiment of the present invention, each of the extended cache and a separation cache has a smaller size than the main cache, and has a higher associativity than the main cache.

In this instance, each of the extended cache and the separation cache is in a same level as the main cache.

In this instance, the main cache may store data based on the direct mapping scheme. Each of the extended cache and the separation cache may store the data based on any one of the full associative scheme and the set associative scheme.

A performance of the cache memory system is determined by a cache hit ratio, a data access time when a cache hit occurs, a penalty when a cache miss occurs, and the like.

A main cache using the direct mapping scheme may be embodied in a relatively simple circuit. Accordingly, a data access time when a cache hit occurs in the main cache may be short. However, a cache hit ratio of the main cache is lower than that of other methods.

A cache memory system, which includes the main cache using the direct mapping scheme, and the separation cache and the extended cache using the full associative scheme or the set associative scheme, similar to the cache memory system where the data storage method according to an exemplary embodiment of the present invention is applied may raise the cache hit ratio by the separation cache and the extended cache as well as maintain a short data access time in the cache hit.

The extended cache of the cache memory system according to another exemplary embodiment of the present invention may evict a previous data to a lower level memory. The previous data is stored in a location where data is to be newly stored in the extended cache.

The extended cache may be any one of the full associative scheme or the set associative scheme. When an empty space no longer exists in the extended cache, or an empty space no longer exists in the location where the data is to be newly stored, any one of the stored previous may be evicted to a lower level memory.

In the data storage method according to another exemplary embodiment of the present invention, when data stored in the lower level memory is accessed by the central processing unit and temporal locality information corresponding to the accessed data satisfies a predetermined condition, the accessed data may be copied to the separation cache.

When storing data, the lower level memory stores the data as well as temporal locality information corresponding to the data. When the data stored in the lower level memory is accessed by the central processing unit and the temporal locality information corresponding to the accessed data satisfies the predetermined condition, the accessed data may be copied to the separation cache. The predetermined condition may be any one of a condition where the accessed data is temporal and a condition where the accessed data is nontemporal.

When the lower level memory is an L2 cache having a similar configuration to the main cache and stores data, the lower level memory may store the data as well as temporal locality information corresponding to the data.

The data storage method according to another exemplary embodiment of the present invention stores only data, excluding temporal locality information corresponding to the data, in the lower level memory. Also, the data may be copied to the main cache, while the temporal locality information is reset.

When the data is stored in the lower level memory, the temporal locality information is lost. When the data is accessed by the central processing unit and is copied to the main cache, the data is stored in the main cache while the temporal locality information is reset.

After storing the data in the main cache, the data is located in any one of the extended cache, the separation cache, and the main cache until the data is evicted to the lower level memory.

In the data storage method according to another exemplary embodiment of the present invention, when data of the extended cache is accessed by the central processing unit in a cache hit, temporal locality information corresponding to the accessed data is updated. Also, when the updated temporal locality information does not satisfy the predetermined condition, the data of the extended cache may be swapped with any one of data of the main cache.

In this instance, a 1-to-N multiplexer may transmit the data to the central processing unit according to a control signal. Otherwise, the data may be swapped with any one of data of the main cache. The 1-to-N multiplexer uses the temporal locality information as the control signal, and N is a natural number greater than two.

The data storage method according to the above-described exemplary embodiments may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention.

According to an exemplary embodiment of the present invention, there is provided a cache memory system which may extend a lifetime of data without an increase of a size of a cache memory.

Also, according to an exemplary embodiment of the present invention, there is provided a cache memory system which may raise a cache hit ratio without an increase of a data access time when a cache hit occurs.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A cache memory system, comprising:
    a main cache which stores first data accessed by a central processing unit (CPU);
    an extended cache which stores second data of the main cache when the second data of the main cache is evicted from the main cache; and
    a separation cache which stores third data of the extended cache, when the third data of the extended cache is evicted from the extended cache, and if temporal locality information corresponding to the third data of the extended cache satisfies a predetermined condition,
    wherein the main cache, the extended cache and the separation cache are the same level caches which are disposed above a level 2 memory.

2. The cache memory system of claim 1, wherein the extended cache evicts the third data of the extended cache to a lower level memory, if the temporal locality information corresponding to the third data does not satisfy the predetermined condition.

3. The cache memory system of claim 2, wherein the lower level memory is another cache.

4. The cache memory system of claim 1, wherein the temporal locality information corresponding to the third data comprises information about a number of times the third data has previously been accessed by the CPU.

5. The cache memory system of claim 1, wherein the predetermined condition comprises a condition where the third data of the extended cache is temporal,
    wherein the separation cache stores only temporal data including the third data, and
    wherein the third data of the extended cache is temporal if the third data has previously been accessed by the CPU more than once during a predetermined time period.

6. The cache memory system of claim 5, wherein the predetermined time period is from a time when the third data is accessed by the CPU and stored in the main cache to a time when the third data is evicted from the main cache and transmitted to a lower level memory.

7. The cache memory system of claim 5, wherein the main cache stores more non-temporal data than temporal data.

8. The cache memory system of claim 1, wherein the predetermined condition comprises a condition where the third data of the extended cache is non-temporal,
    wherein the separation cache stores only non-temporal data including the third data, and
    wherein the third data of the extended cache is non-temporal if the third data has not previously been accessed by the CPU more than once during a predetermined time period.

9. The cache memory system of claim 8, wherein the main cache stores more temporal data than non-temporal data.

10. The cache memory system of claim 8, wherein the predetermined time period is from a time when the third data is accessed by the CPU and stored in the main cache to a time when the third data is evicted from the main cache and transmitted to a lower level memory.

11. The cache memory system of claim 8, wherein the main cache stores the first data based on a direct mapping.

12. The cache memory system of claim 1, wherein each of the extended cache and the separation cache is smaller than the main cache, and has a higher associativity than the main cache.

13. The cache memory system of claim 1, wherein each of the extended cache and the separation cache are at a same level as the main cache.

14. The cache memory system of claim 1, wherein, when the third data of the extended cache is accessed by the CPU, temporal locality information corresponding to the third data is updated, and when the updated temporal locality information does not satisfy the predetermined condition, the third data of the extended cache is swapped with the first data of the main cache.

15. The cache memory system of claim 1 further comprising a lower level memory to which the extended cache evicts the third data if the temporal locality information does not satisfy the predetermined condition,
    wherein, when fourth data stored in the lower level memory is accessed by the CPU and temporal locality information corresponding to the fourth data satisfies the predetermined condition, the fourth data is copied to the separation cache.

16. The cache memory system of claim 1, further comprising a lower level memory to which the extended cache evicts the third data of the extended cache if the temporal locality information does not satisfy the predetermined condition,
    wherein when the extended cache evicts the third data to the lower level memory, the temporal locality information corresponding to the third data is not stored in the lower level memory, and
    wherein when the third data is copied to the main cache, the temporal locality information corresponding to the third data is reset.

17. The cache memory system of claim 1, wherein each of the first data, the second data and the third data is data to be accessed by the CPU not through a memory which is not a cache.

18. A data storage method, comprising:
    storing first data evicted from a main cache, in an extended cache;
    determining whether temporal locality information corresponding to second data stored in the extended cache satisfies a predetermined condition when the second data is evicted from the extended cache;
    storing the second data in a separation cache if the temporal locality information corresponding to the second data satisfies the predetermined condition as a result of the determining; and
    evicting the second data to a lower level memory if the temporal locality information corresponding to the second data does not satisfy the predetermined condition as the result of the determining,
    wherein the main cache, the extended cache and the separation cache are the same level caches which are disposed above a level 2 memory.

19. The data storage method of claim 18, wherein the temporal locality information corresponding to the second data comprises information about a number of times the second data has previously been accessed by a central processing unit (CPU).

20. The data storage method of claim 18, wherein the predetermined condition comprises a condition where the second data is temporal,
wherein the separation cache stores only temporal data including the second data, and
wherein the second of the extended cache is temporal if the second data has previously been accessed by the CPU more than once during a predetermined time period.

21. The data storage method of claim 20, wherein the predetermined time period is from a time when the second data is accessed by the CPU and stored in the main cache to a time when the second data is evicted from the main cache and transmitted to a lower level memory.

22. The data storage method of claim 20, wherein the main cache stores more non-temporal data than temporal data.

23. The data storage method of claim 18, wherein the predetermined condition comprises a condition where the second data is non-temporal,
wherein the separation cache stores only non-temporal data including the third data, and
wherein the second data of the extended cache is non-temporal if the second data has not previously been accessed by a central processing unit (CPU) more than once during a predetermined time period.

24. The data storage method of claim 23, wherein the predetermined time period is from a time when the second data is accessed by the CPU and stored in the main cache to a time when the second data is evicted from the main cache and transmitted to a lower level memory.

25. The data storage method of claim 23, wherein the main cache stores more temporal data than non-temporal data.

26. The data storage method of claim 18, wherein the separation cache is smaller than the main cache.

27. The data storage method of claim 26, wherein the main cache stores third data based on a direct mapping.

28. The data storage method of claim 18, wherein each of the extended cache and the separation cache has a higher associativity than the main cache.

29. The data storage method of claim 18, wherein, when the second data of the extended cache is accessed by a central processing unit (CPU), and temporal locality information corresponding to the second data is updated, and if the updated temporal locality information does not satisfy the predetermined condition, the second data of the extended cache is swapped with third data stored in the main cache.

30. The data storage method of claim 18, wherein, when third data stored in the lower level memory is accessed a central processing unit (CPU) and if temporal locality information corresponding to the third data satisfies the predetermined condition, the third data is copied to the separation cache,
wherein the temporal locality information corresponding to the third data comprises information about a number of times the third data has previously been accessed by the CPU.

31. The data storage method of claim 18, wherein when the second data is evicted to the lower level memory, the temporal locality information corresponding to the second data is not stored in the lower level memory, and
wherein when the second data is copied to the main cache, the temporal locality information corresponding to the second data is reset.

32. The data storage method of claim 18, wherein each of the first data and the second data is data to be accessed by a central processing unit (CPU) not through a memory which is not a cache.

33. A computer-readable medium storing a program for implementing a data storage method, comprising:
storing first data evicted from a main cache in an extended cache;
determining whether temporal locality information corresponding to second data stored in the extended cache satisfies a predetermined condition when the second data is evicted from the extended cache;
storing the second data in a separation cache if the temporal locality information corresponding to the second data satisfies the predetermined condition as a result of the determining; and
evicting the second data to a lower level memory when the temporal locality information corresponding to the second data does not satisfy the predetermined condition as the result of the determining,
wherein the main cache, the extended cache and the separation cache are the same level caches which are disposed above a level 2 memory.

* * * * *